(12) United States Patent
Martin et al.

(10) Patent No.: US 11,131,389 B2
(45) Date of Patent: Sep. 28, 2021

(54) FLUID VALVES HAVING VARYING FLUID PASSAGEWAYS

(71) Applicant: FISHER CONTROLS INTERNATIONAL LLC, Marshalltown, IA (US)

(72) Inventors: Lawrence Martin, Marshalltown, IA (US); Luke Allen Novak, Ames, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 72 days.

(21) Appl. No.: 16/597,599

(22) Filed: Oct. 9, 2019

(65) Prior Publication Data

US 2021/0108659 A1 Apr. 15, 2021

(51) Int. Cl.
| | |
|---|---|
| *F16K 1/06* | (2006.01) |
| *F16K 27/02* | (2006.01) |
| *F16K 1/08* | (2006.01) |
| *F16K 1/32* | (2006.01) |
| *F15D 1/06* | (2006.01) |

(52) U.S. Cl.
CPC ............ *F16K 1/06* (2013.01); *F15D 1/06* (2013.01); *F16K 1/08* (2013.01); *F16K 27/02* (2013.01); *F16K 1/32* (2013.01)

(58) Field of Classification Search
CPC ... F16K 1/32; F16K 27/02; F16K 1/06; F16K 1/08
See application file for complete search history.

(56) References Cited

U.S. PATENT DOCUMENTS

| | | | | |
|---|---|---|---|---|
| 1,720,130 | A * | 7/1929 | Knupfer | F16K 1/06 251/142 |
| 2,269,404 | A * | 1/1942 | Haven | F16K 1/10 251/152 |
| 2,685,426 | A * | 8/1954 | Macgregor | F16K 1/10 251/118 |
| 3,975,810 | A * | 8/1976 | Siepmann | B23P 13/00 29/890.129 |
| 2014/0061527 | A1 * | 3/2014 | Hilsabeck | F16K 47/08 251/356 |
| 2015/0362080 | A1 * | 12/2015 | Vu | F16K 1/12 137/1 |

\* cited by examiner

*Primary Examiner* — Atif H Chaudry
(74) *Attorney, Agent, or Firm* — Hanley, Flight & Zimmerman, LLC

(57) ABSTRACT

Example fluid valves having non-circular flow passageways are disclosed. An example fluid valve includes a body defining a fluid passageway between an inlet and an outlet, at least a portion of the fluid passageway between the inlet and the outlet has a generally non-circular cross-sectional shape when taken along a plane transverse to a direction of fluid flow, the cross-sectional shape includes a curved central axis, with outwardly curved end walls and curved lateral walls joining the curved end walls.

18 Claims, 11 Drawing Sheets

FLUID VALVES HAVING VARYING FLUID PASSAGEWAYS

FIELD OF DISCLOSURE

This disclosure relates generally to valves and, more particularly, fluid valves having non-circular flow paths.

BACKGROUND

Industrial processing plants use control valves in a wide variety of applications such as, for example, controlling product flow in a food processing plant, maintaining fluid levels in large tank farms, etc. Control valves are used to manage the product flow or to maintain the fluid levels by functioning like a variable passage.

SUMMARY

An example fluid valve includes a body defining a fluid passageway between an inlet and an outlet, at least a portion of the fluid passageway between the inlet and the outlet has a generally non-circular cross-sectional shape when taken along a plane transverse to a direction of fluid flow, the cross-sectional shape includes a curved central axis, with outwardly curved end walls and curved lateral walls joining the curved end walls.

An example fluid valve includes a body defining an inlet, an outlet, and a fluid passageway fluidly coupling the inlet and the outlet, at least a portion of the fluid passageway between the inlet and the outlet having a generally bean-shaped, cross-section when taken along a plane transverse to a direction of fluid flow through the at least the portion of the fluid passageway.

An example fluid valve includes a body defining a fluid passageway between an inlet and an outlet, at least a portion of the fluid passageway defines a cross-sectional shape that varies in a direction of fluid flow between a generally circular shape and a generally bean-like shape.

Figure 1:
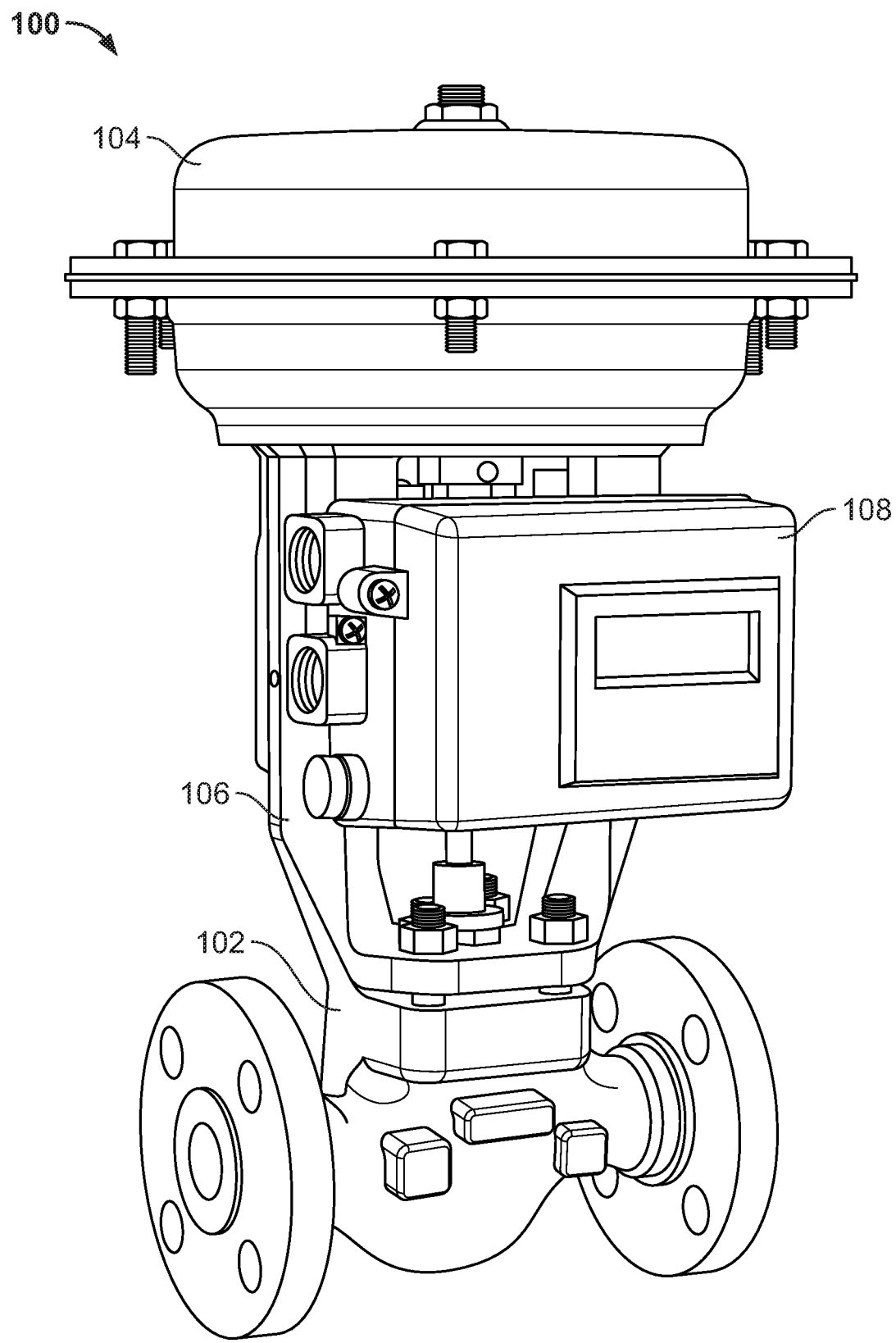
FIG. 1 is an example control valve having an example valve body constructed in accordance with teachings of this disclosure.

The figures are not to scale. Instead, the thickness of the layers or regions may be enlarged in the drawings. In general, the same reference numbers will be used throughout the drawing(s) and accompanying written description to refer to the same or like parts. Although the figures show layers and regions with clean lines and boundaries, some or all of these lines and/or boundaries may be idealized. In reality, the boundaries and/or lines may be unobservable, blended, and/or irregular.

DETAILED DESCRIPTION

Figure 12:
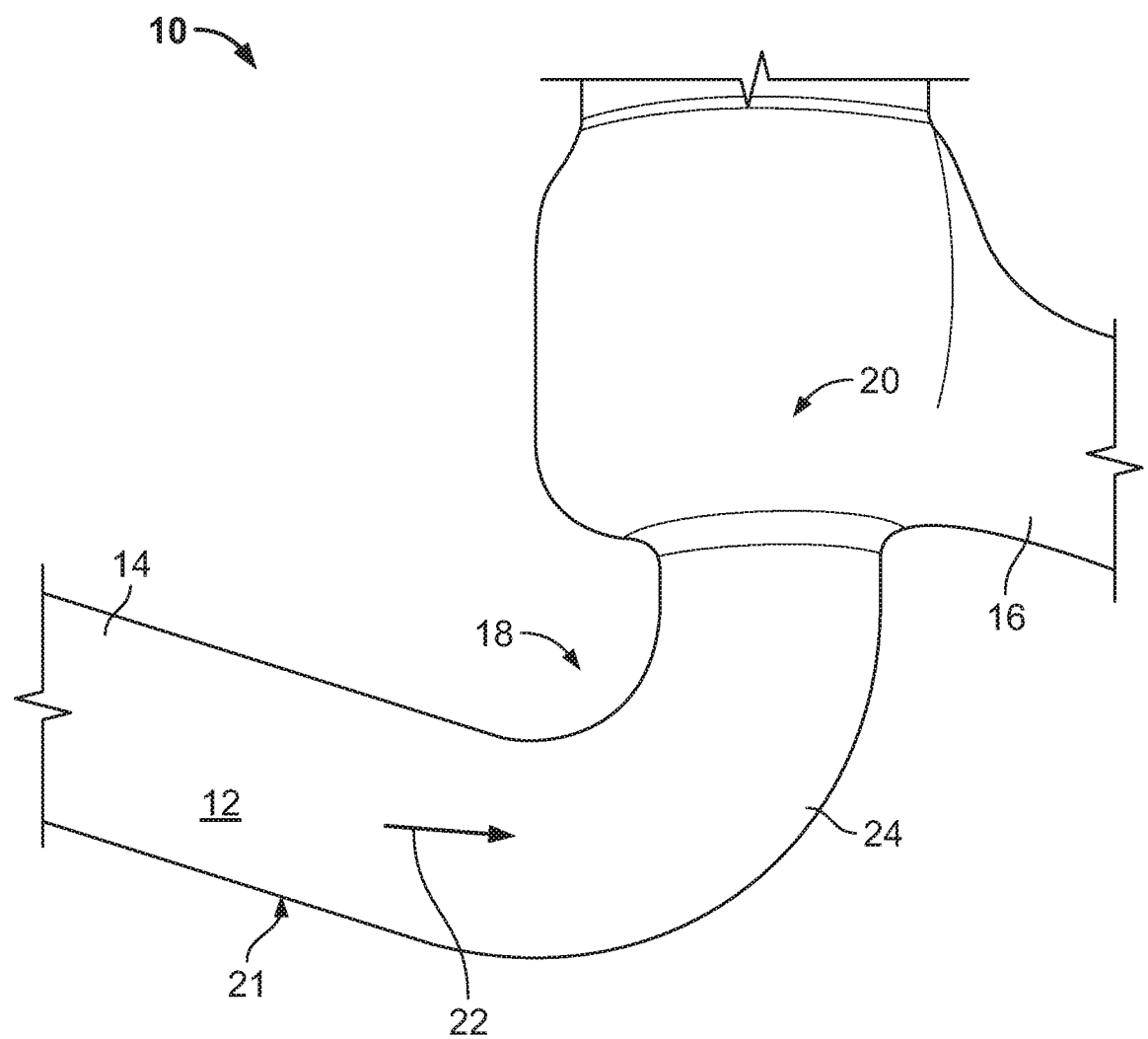
FIG. 12 is a partial, cross-sectional view of a known valve body having a circular shaped fluid passageway.

Fluid valves are often employed to control fluid flow through a valve body. In some instances, a fluid passageway of a fluid valve can contribute to flow separation, resulting in loss of flow area efficiency and/or increased pressure loss, which reduces valve flow performance. For example, FIG. 12 is cross-sectional view of a known valve body 10 defining a fluid passageway 12 between an inlet 14 and an outlet 16. The fluid passageway 12 has a sharp/shallow profile 18 adjacent an orifice 20 of the fluid passageway 12. As fluid flows through the fluid passageway 12 and accelerates around a radius turning from a lower body passage 21 toward the outlet 16, the fluid flow experiences an adverse pressure gradient in a direction of fluid flow 22 (e.g., a pressure gradient acting in opposition of a local flow momentum of a bulk fluid flow). This pressure gradient can cause an undesirable effect of inducing separation of a boundary layer from an inner wall 24 of the valve body 10 defining the fluid passageway 12. Such flow separation can cause a reduced localized effective flow area, resulting in loss of flow area efficiency and/or increased pressure loss. In some instances, such flow separation can contribute to system noise and vibration.

Example fluid valves disclosed herein reduce boundary layer separation to improve fluid flow efficiency, reduce noise, vibration, cavitation, etc. To reduce boundary layer separation, example fluid valves disclosed herein employ a fluid passageway in which at least a portion of the fluid passageway has a non-circular profile (i.e., a cross-section transverse to the direction of fluid flow). The fluid passageway provides a relatively smooth and/or gradual transition between a portion of the fluid passageway having a circular profile and a portion of the fluid passageway having a non-circular profile. For example, the non-circular profile may have a bean-like shape (i.e., a bean-like cross-section taken traverse to a direction of fluid flow). The non-circular profile provides a straighter fluid flow path in a direction of fluid flow. Additionally, the non-circular profile induces localized cross-flow to reduce and/or prevent boundary layer separation and improve flow efficiency. Such cross-flow can be induced by local pressure differentials acting from an outer to inner portion of the cross-section and reduces a magnitude of a streamwise adverse pressure gradient, thereby delaying and/or preventing separation of the boundary layer and associated impact on valve flow performance. Additionally, the non-circular flow passageway provides strength in a web thickness area to allow more of a cross-sectional area to be above a minimum web thickness height.

FIG. 1 is an example control valve assembly 100 having an example fluid valve 102 constructed in accordance with teachings of this disclosure. The control valve assembly 100 of the illustrated example includes the fluid valve 102 coupled to an actuator 104 (e.g., a pneumatic actuator) via a bonnet 106. To control fluid flow through the fluid valve 102, the control valve assembly 100 includes a controller 108 (e.g., a digital controller). While the example fluid valve 102 is described with reference to the example control valve assembly 100 of FIG. 1, it should be understood that the example fluid valves and/or fluid passageways described herein may be used with any number and/or type(s) of fluid valves. For example, while the fluid valve 102 depicted in FIG. 1 is a sliding stem control valve, the example fluid valves and/or flow passageways disclosed herein may be used with any other type(s) of valves including, but not limited to, rotary control valves, quarter-turn control valves, etc., and/or any other suitable fluid valve(s).

Figure 2:
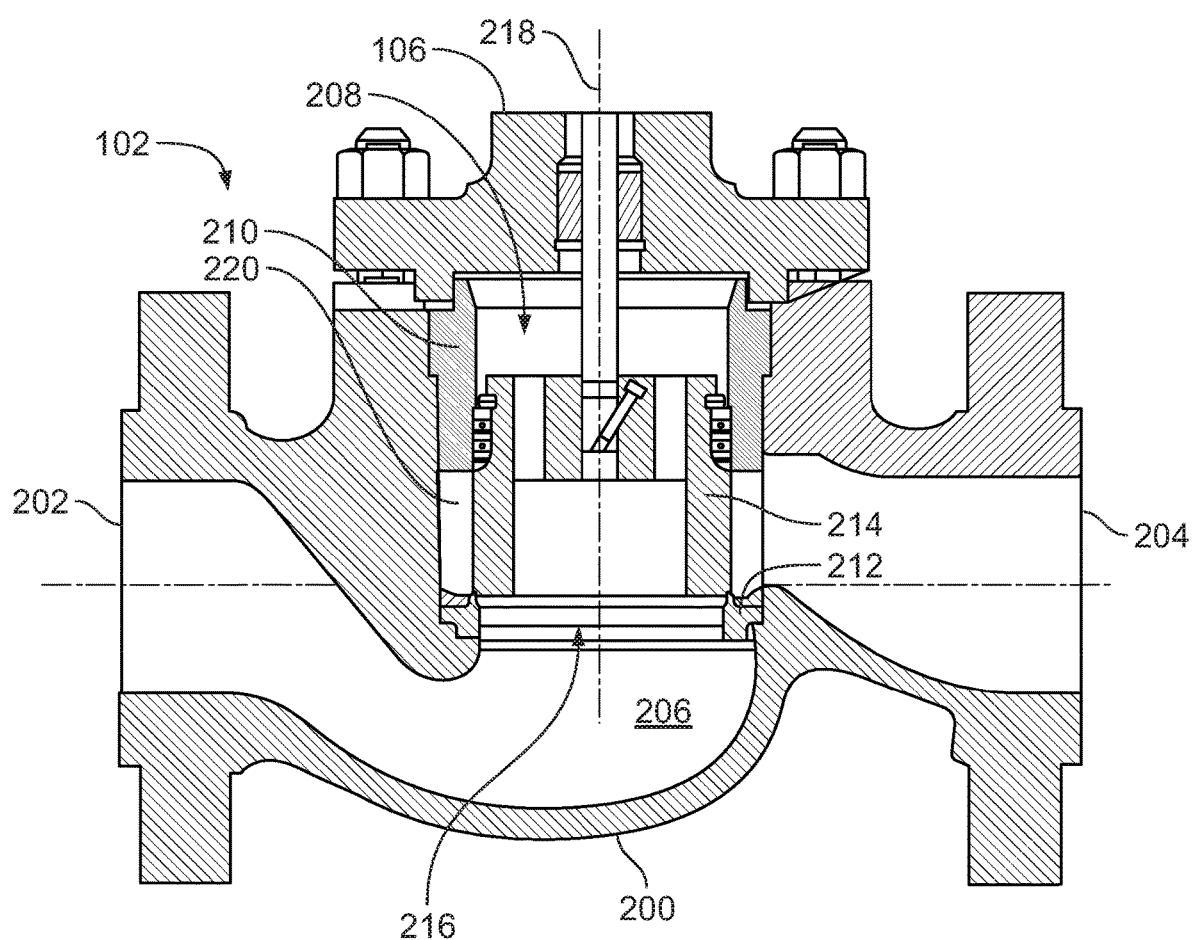
FIG. 2 is a cross-sectional view of the example control valve of FIG. 1.

FIG. 2 is a cross-sectional view of the example fluid valve 102 of FIG. 1. The example fluid valve 102 has a valve body 200 that defines an inlet 202, an outlet 204 and a fluid passageway 206 connecting the inlet 202 and the outlet 204. A trim assembly 208 is disposed within the fluid passageway 206. The bonnet 106 retains the valve trim assembly 208 in the valve body 200. The trim assembly 208 includes a cage 210 and a valve seat 212. A closure member 214 (e.g., a valve plug) is disposed within the cage 210. Specifically, the closure member 214 is movable or slidable within the cage 210 and interacts with the valve seat 212 to control fluid flow through an orifice 216 of the fluid passageway 206. A stem 218 couples the closure member 214 to the actuator 104 (FIG. 1). In FIG. 2, the fluid valve 102 is configured in a flow-up configuration. In some examples, the fluid valve 102 can be configured in a flow-down configuration (e.g., the inlet 202 and the outlet 204 are reversed).

In operation, the controller 108 (FIG. 1) supplies a control fluid (e.g., pressurized air) from a supply source to the actuator 104. The control fluid provides a pressure differential across a sensing element of the actuator 104 to move the closure member 214 relative to the valve seat 212 to regulate fluid flow through the fluid passageway 206. For example, the actuator 104 controls movement (e.g., rectilinear movement) of the closure member 214 relative to the valve seat 212 (e.g., bi-directionally) between a fully closed position and a fully open position to modulate fluid flow through the fluid passageway 206. The actuator 104 moves the closure member 214 relative to the valve seat 212 between a closed position (e.g., a fully closed position) at which the closure member 214 (e.g., sealingly) engages the valve seat 212 and a fully open or maximum flow rate position (e.g., a fully open position) at which the closure member 214 is positioned at a distance away from the valve seat 212. Additionally, the valve trim assembly 208 provides certain fluid flow characteristics to fluid flowing through the fluid passageway 206. The cage 210 of FIG. 2 includes an opening 220 to characterize fluid flow (e.g., reduce noise, cavitation, etc.) as the fluid flows through the fluid passageway 206. The opening 220 of the cage 210 can be sized and/or shaped to provide desired fluid flow characteristics (e.g., reduce noise, reduced cavitation, etc.). In some examples, the cage 210 includes a plurality of openings.

In operation, the fluid passageway 206 of the illustrated example provides improved flow efficiency by inducing cross flow, reducing a severity of flow separation, reducing dead flow zones, and/or allowing for a smoother flow passage. Additionally, the fluid passageway 206 of the illustrated example allows for a shorter (e.g., shaper) face-to-face transition (e.g., a valve inlet to valve outlet transition) without compromising a structural strength of a web of the valve). A shorter face-to-face transition provides a more abrupt or shaper transition between the inlet 202/outlet 204 to the orifice 216 of the valve body 200. For instance, the valve 100 of the illustrated example has a more abrupt transition between the inlet 202 and the outlet 204 to the orifice 216 section of the fluid passageway 206 than a valve implemented without the fluid passageway 206 disclosed herein. However, in some examples, the fluid passageway 206 and/or the cage 210 provide improved flow efficiency while providing a shorter face-to-face transition. In some examples, different style cages can be employed.

Figure 3A:
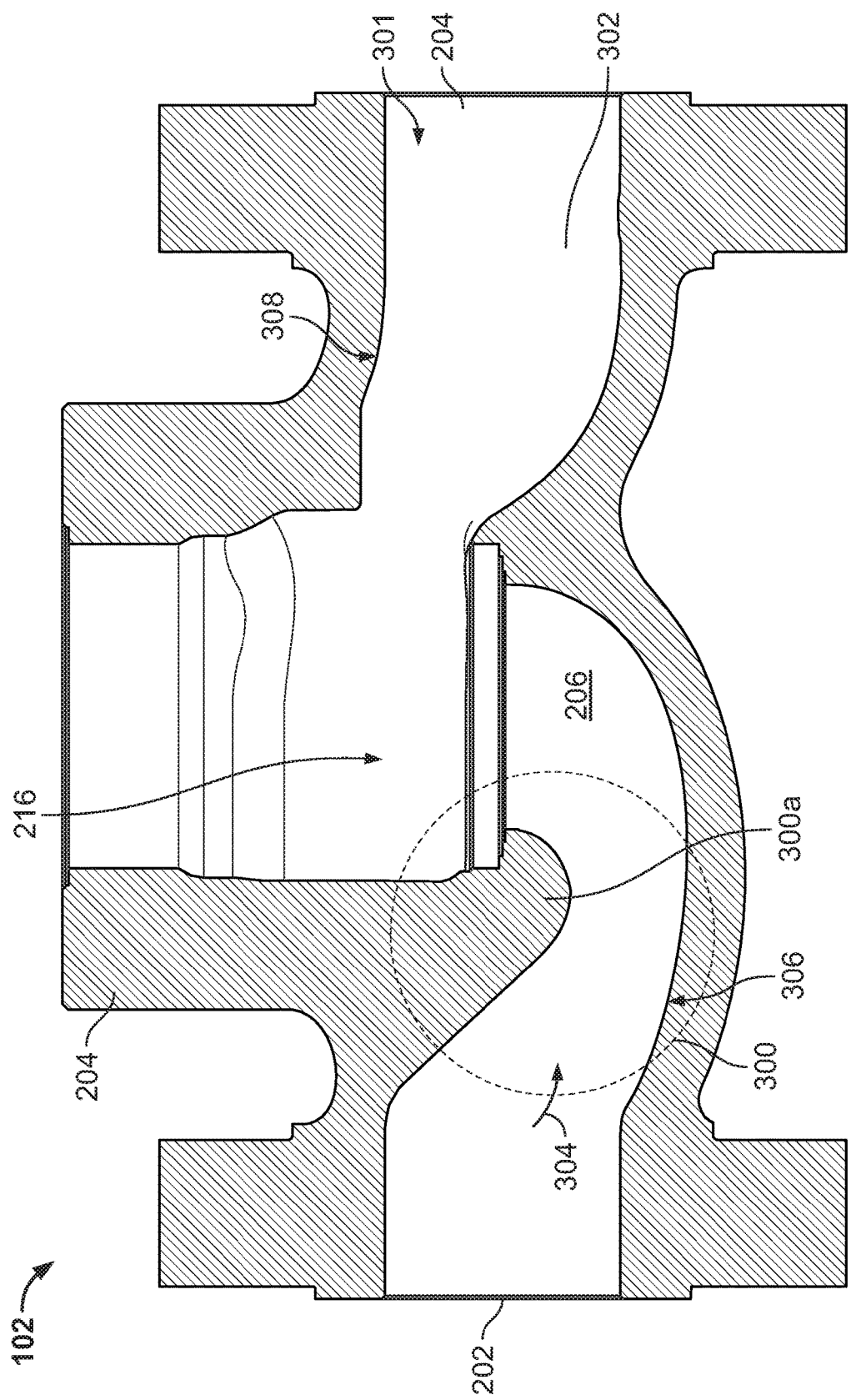
FIG. 3A is a cross-sectional view of the example valve body of FIGS. 1 and 2.
Figure 3B:
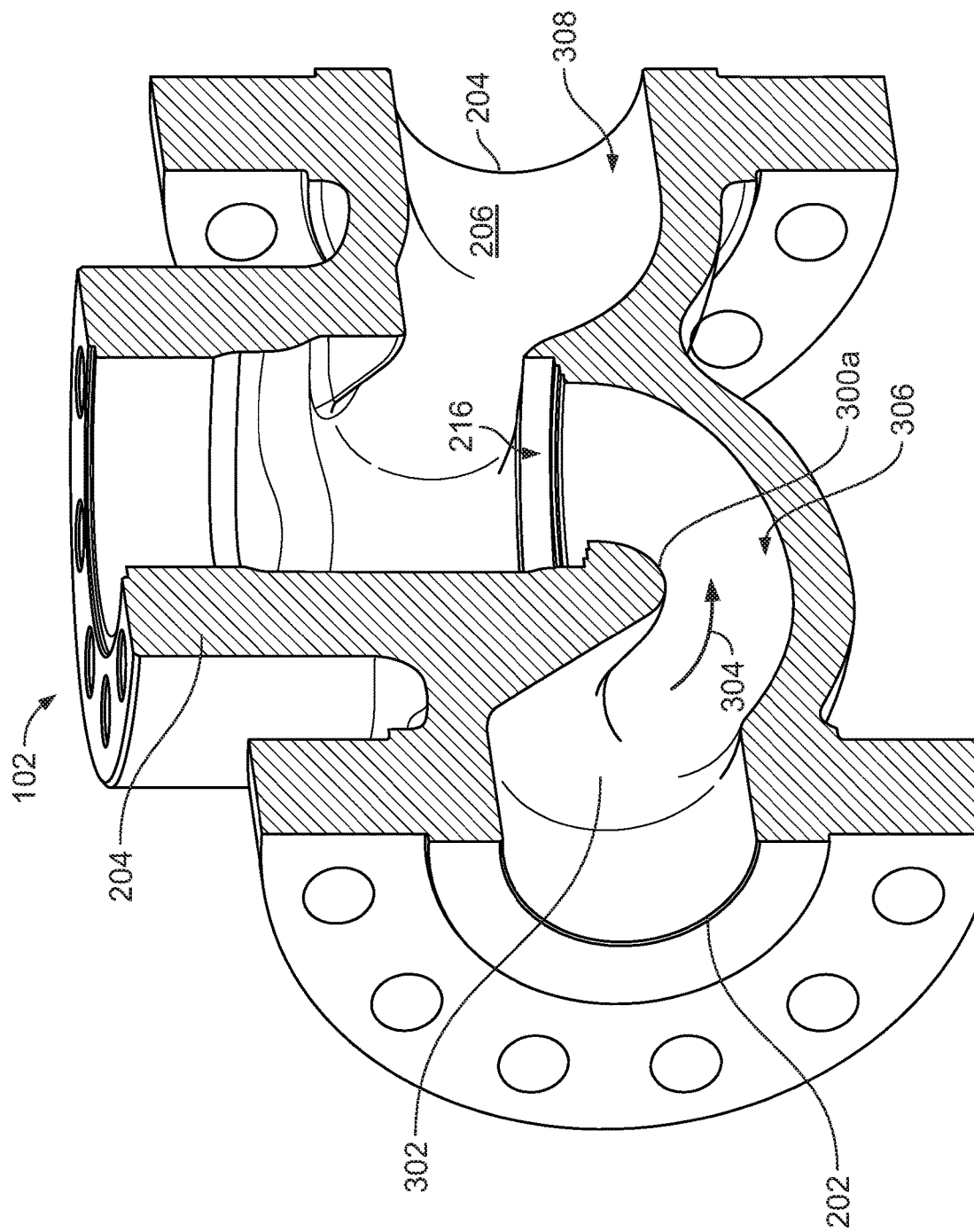
FIG. 3B is a perspective cutaway view of FIG. 3A.
Figure 3C:
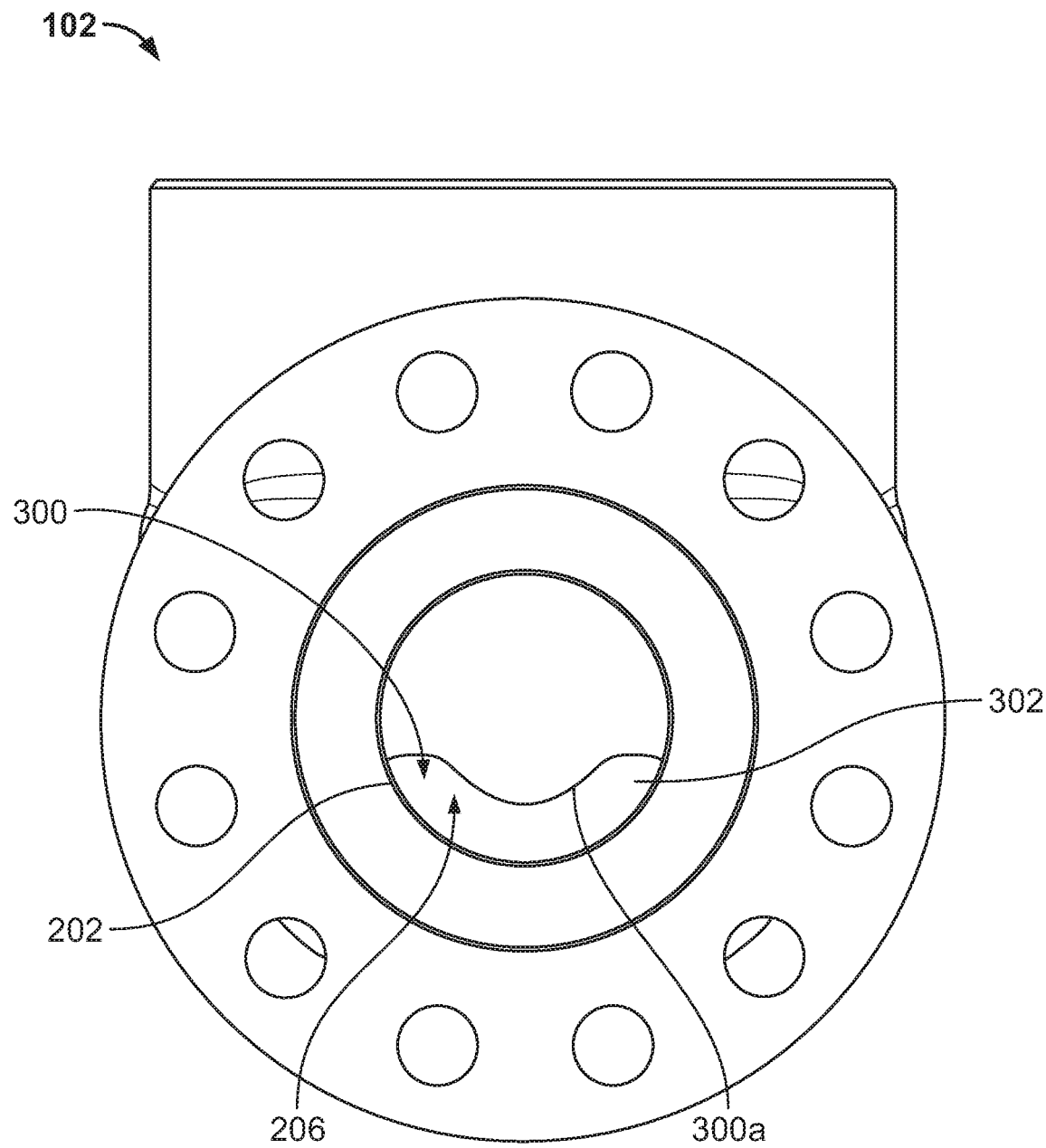
FIG. 3C is an end view of the example valve body of FIGS. 1 and 2.

FIG. 3A is a cross-sectional view of the example fluid valve 102 of FIG. 1. FIG. 3B is a perspective cutaway view of FIG. 3A. FIG. 3C is an end view of the example fluid valve 102 of FIGS. 1, 2, 3A and 3B. Specifically, FIG. 3C is from the viewpoint of the inlet 202. Referring to FIGS. 3A-3C, the valve body 200 defines forms an inner wall 302 (e.g., an inner surface) that defines the fluid passageway 206 between the inlet 202 and the outlet 204. For example, the inner wall 302 of the valve body 200 between the inlet 202 and the outlet 204 defines a shape of the fluid passageway 206.

The fluid passageway 206 of FIG. 3 includes a non-varying flow path portion 301 between the inlet 202 and the outlet 204. The non-varying flow path has a generally circular profile (e.g., a generally circular cross-sectional shape). To improve flow efficiency of the fluid valve 102, the fluid passageway 206 has at least a varying flow path portion 300 between the inlet 202 and the outlet 204. The varying flow path portion 300 of the fluid passageway 206 has a non-circular profile (e.g., a generally non-circular cross-sectional shape). For example, the non-circular shape is a generally bean-like shape (see FIG. 10). Thus, the shape of the fluid passageway 206 varies between a generally circular shape and a generally non-circular shape.

As used herein, "cross-sectional shape," "fluid profile," "circular shape," "non-circular shape," or "bean-like shape" of the fluid passageway 206 means a cross-sectional shape of the fluid passageway 206 (e.g., defined by the inner wall 302 of the valve body 200) taken along a plane that is transverse to a direction of fluid flow 304 through the fluid passageway 206.

For example, in FIG. 3C, the inlet 202 of the fluid passageway 206 provides a flow path having a generally circular cross-section traverse to the direction of fluid flow, and the varying flow path portion 300 provides a flow path having a geometrically bean-like cross-sectional shape transverse to the direction of fluid flow 304. The inlet 202, the outlet 204 and the orifice 216 of FIGS. 3A-3C have circular cross-sectional shapes traverse to a direction of fluid flow. Thus, the cross-sectional shape of the fluid passageway 206 varies from a generally circular shape adjacent the inlet 202, to a generally non-circular shape defined by the varying flow path portion 300, and then to a generally circular shape adjacent the orifice 216 and/or the outlet 204. Additionally, the fluid passageway 206 has a relatively straight profile (e.g., compared to the valve body 10 of FIG. 12) in the direction of fluid flow 304 (e.g., bulk fluid flow). In this manner, the varying flow path portion 300 provides a more gradually curved flow path 300a as the fluid flows toward the orifice 216 and the outlet 204, which reduces and/or prevents adverse pressure gradient and/or boundary layer separation.

In FIGS. 3A-3C, the varying flow path portion 300 is formed between the inlet 202 and the orifice 216 (e.g., a lower core 306 of the valve body 200). In some examples, the varying flow path portion 300 can be formed in the valve body 200 between the orifice 216 and the outlet 204 (e.g., an upper core 308 of the valve body 200). In some examples, a fluid valve can include a first varying flow path portion (e.g., the varying flow path portion 300) between the inlet 202 and the orifice 216, and a second varying flow path portion (e.g., the varying flow path portion 300) between the orifice 216 and the outlet 204. In some examples, the lower core 306 and/or the upper core 308 can have a first varying flow path and a second varying flow path portion.

Figure 4:
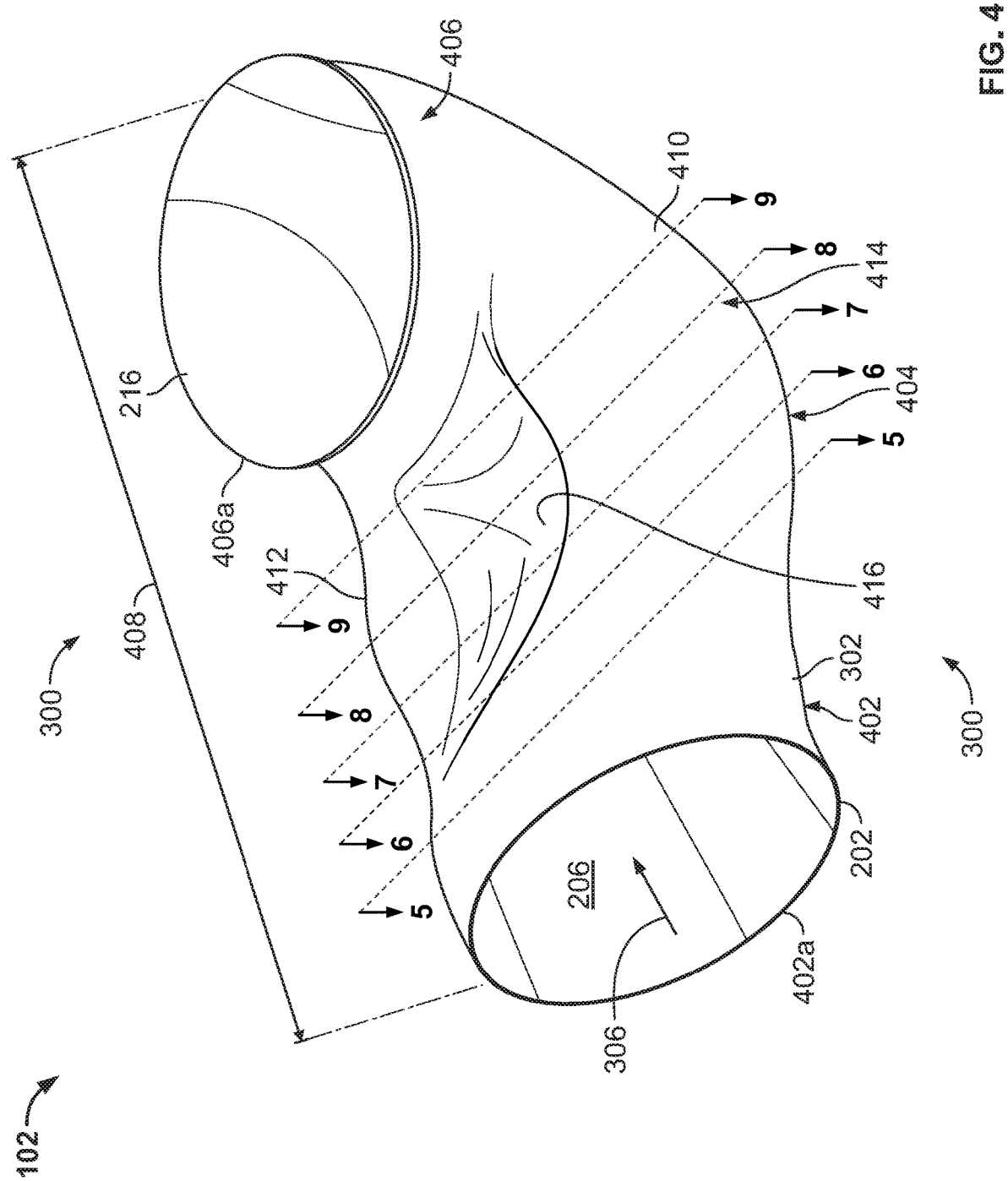
FIG. 4 is a perspective view of a portion of a fluid passageway of the example valve body of FIGS. 1 and 2.

FIG. 4 is a perspective view of a portion of the fluid passageway 206 that includes varying flow path portion 300. For clarity, in FIG. 4, the varying flow path portion 300 is shown as defined by the inner wall 302 of the valve body 200 and other portions of the valve body 200 are not shown. Referring to FIG. 4, the varying flow path portion 300 includes a first section 402 (e.g., a first end 402a), a second section 404 (e.g., an intermediate section) and a third section 406 (e.g., a second end 406a). The second section 404 is positioned between the first section 402 and the third section 406. The first section 402, the second section 404 and the third section 406 define a length 408 of the varying flow path portion 300. In FIG. 4, the first section 402 defines the inlet 202 and the third section 406 defines the orifice 216 (e.g., a portion of the valve body 200 that receives the valve seat 212). The varying flow path portion 300 of FIG. 4 has an L-shape. Additionally, sides 410, 412 of the inner wall 302 of the valve body 200 taper outwardly between the first section 402 and a portion 414 (e.g., a midpoint) of the second section 404 and taper inwardly between the portion 414 (e.g., the midpoint) of the second section 404 and the third section 406 (e.g., the orifice 216). Additionally, an upper surface 416 of the inner wall 302 defining the portion 414 of the second section 404 is dimpled or recessed to protrude into the fluid passageway 206 between the sides 410, 412. In some examples, the first section 402 can define the outlet 204 and/or any other portion of the fluid passageway 206. In some examples, the third section 406 can define the outlet 204 and/or any other portion of the fluid passageway 206. In some examples, the varying flow path portion 300 can have a substantially straight shape (i.e., a non-L shape) and/or any other shape.

The varying flow path portion 300 has a cross-sectional shape that varies between a generally circular shape and a generally non-circular shape in the direction of fluid flow 304 and/or along segments of the length 408. For example, FIGS. 5-9 illustrate different cross-sectional views of the varying flow path portion 300 taken along lines 5-5, 6-6, 7-7, 8-8 and 9-9, respectively.

Figure 5:
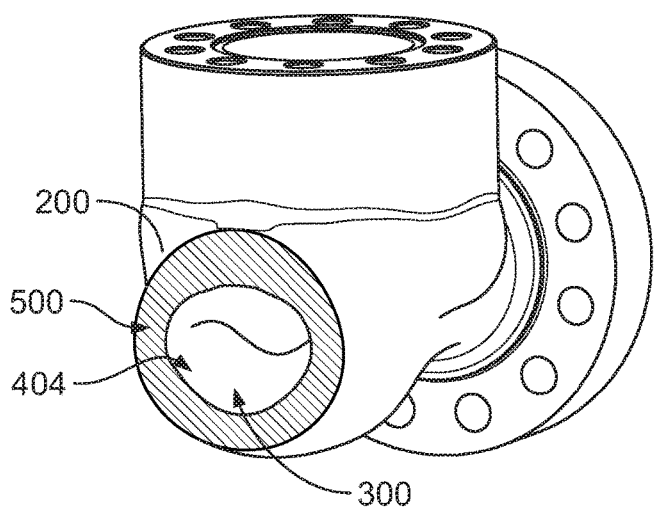
FIG. 5 is a cross-sectional view of the example valve body taken along lines 5-5 of FIG. 4.

FIG. 5 is a cross-sectional, perspective view of the valve body 200 taken along lines 5-5 of FIG. 4. The cross-sectional view includes a fourth section 500 of the varying flow path portion 300 that has a generally oval cross-sectional shape. The fourth section 500 is positioned between the first section 402 and the second section 404 (e.g., a midpoint of the second section 404).

Figure 6:
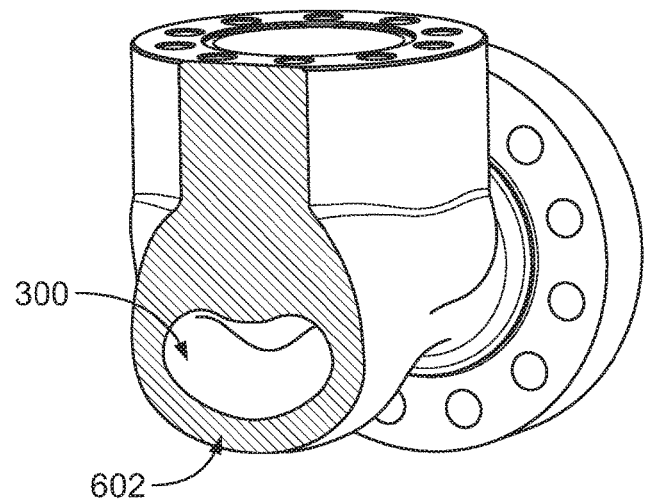
FIG. 6 is a cross-sectional view of the example valve body taken along lines 6-6 of FIG. 4.
Figure 7:
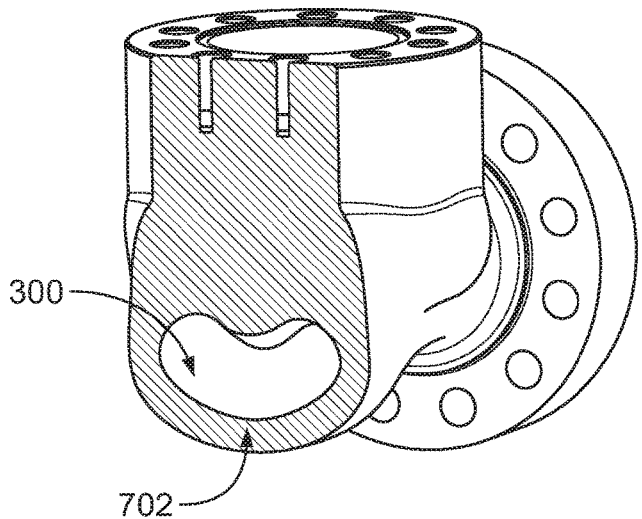
FIG. 7 is a cross-sectional view of the example valve body taken along lines 7-7 of FIG. 4.

FIG. 6 is a cross-sectional, perspective view of the valve body 200 taken along line 6-6 of FIG. 4. FIG. 7 is a cross-sectional, perspective view of the valve body 200 taken along line 7-7 of FIG. 4. The cross-sectional, perspective views of FIGS. 6 and 7 show respective segments 602, 702 of the fluid passageway 206 transitioning to the bean-like cross-sectional shape of the varying flow path portion 300.

Figure 8:
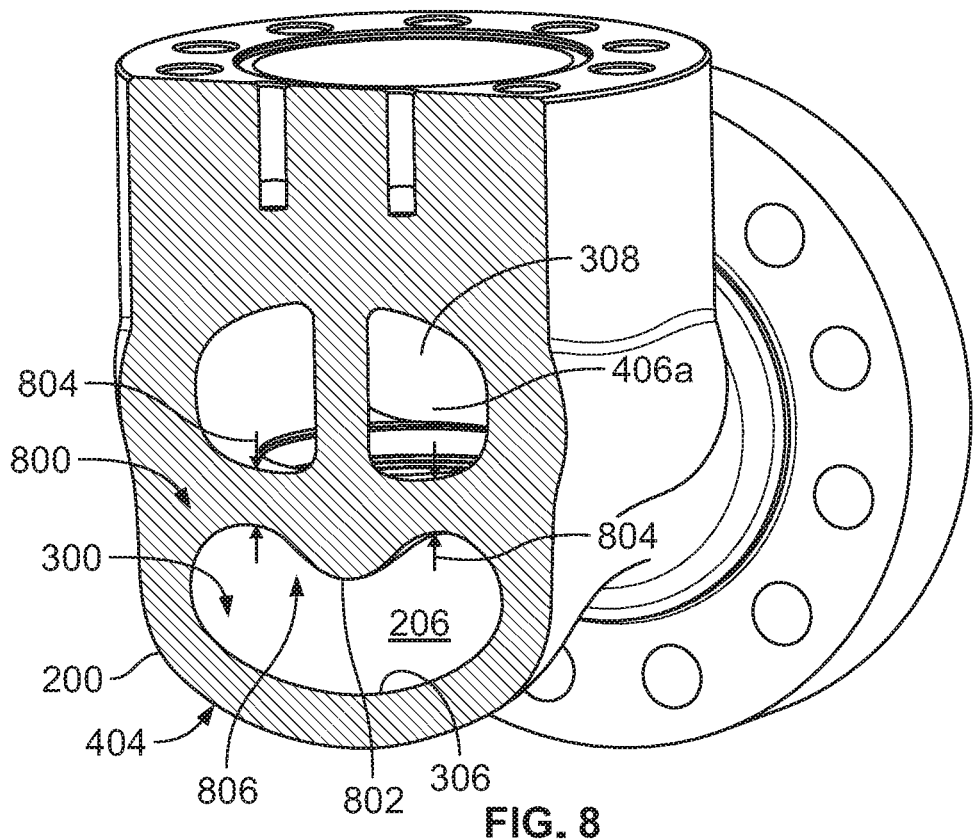
FIG. 8 is a cross-sectional view of the example valve body taken along lines 8-8 of FIG. 4.

FIG. 8 is a cross-sectional, perspective view of the valve body 200 taken along lines 8-8 of FIG. 4. Specifically, FIG. 8 is taken along a midpoint 800 of the second section 404 (e.g., the intermediate portion). The varying flow path portion 300 of FIG. 8 has a generally bean-like cross-sectional shape. As shown in FIG. 8, a portion 802 of the bean-shape cross-sectional shape protrudes into the fluid flow passageway 206. The bean-like cross-sectional shape of the varying flow path portion 300 and/or the protrusion 802 (e.g., the increased thickness of the protrusion 802) provide improved structural support compared to conventional fluid valve bodies. For example, the bean-like cross-sectional (e.g., a geometric shape of the varying flow path portion 300) enables a thickness 804 of a web portion 806 to be reduced at the bean-like cross-section locations while maintaining a structural integrity of the valve body 200 (e.g., compared to a valve without the bean-like shape cross-section).

Figure 9:
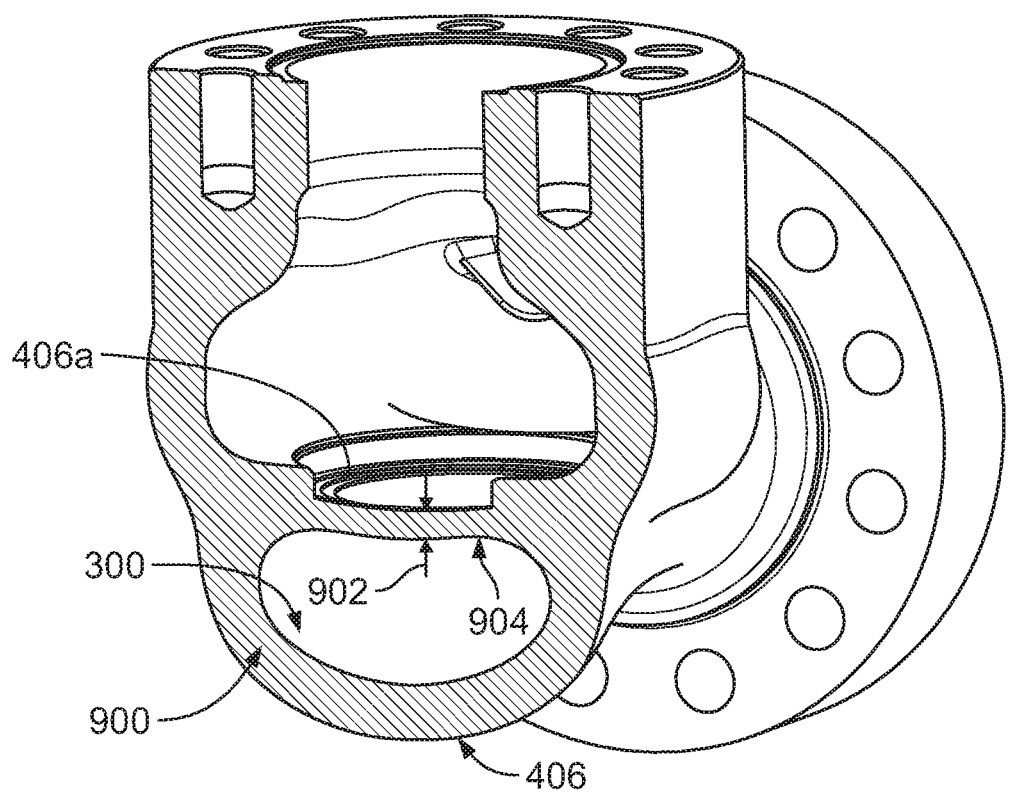
FIG. 9 is a cross-sectional view of the example valve body taken along lines 9-9 of FIG. 4.

FIG. 9 is a cross-sectional, perspective view of the valve body 200 taken along lines 9-9 of FIG. 4. The cross-sectional view includes a fifth section 900 of the varying flow path portion 300 that has a generally oval cross-sectional shape. The fifth section 900 is positioned between the second section 404 (e.g., the midpoint 800 of the second section 404) and the second end 406a. In some examples, the improved structural strength provided by a geometrical shape of the bean-like cross-sectional shape can allow for a reduced thickness 902 of a web portion 904 without reducing an overall strength of the web of the valve body. In some examples, the web portion 904 does not include a reduced thickness (e.g., compared to a valve implemented without the fluid passageway 206). As shown in FIG. 9, the web portion 904 is the thickness 902 of the valve body 200 between the lower flow passage 306 and the upper flow passage 308. The web portion 904 provides structural support to receive the cage 210 and/or the plug 214 and can withstand loads (e.g., closing forces) applied by the actuator 104 to the valve plug 214.

Referring to FIGS. 4-9, the fluid passageway 206 varies from a generally circular cross-sectional shape provided at the first end 402a (e.g., the first section 402), to a generally non-circular cross-sectional shape provided by the second section 404 (e.g., the intermediate portion), and then to a generally circular cross-sectional shape provided by the second end 406a (e.g., the third section 406). Although the fluid passageway 206 has a circular shape portion and the non-circular shape portion, the varying flow path portion 300 provides a relatively smooth and/or gradual transition between a circular shape portion of the fluid passageway 206 and the non-circular portion of the fluid passageway 206. For example, the varying flow path portion 300 defines a varying fluid flow path in the direction of fluid flow 304 that varies from a generally circular cross-section (e.g., at the first end 402a), to a generally oval cross-section (e.g., at the fourth section 500), to the generally bean-shaped cross-section (e.g., at the midpoint 800), to the generally oval cross-section (e.g., at the fifth section 900) and then to a generally circular cross-section (e.g., at the second end 406a).

Figure 10:
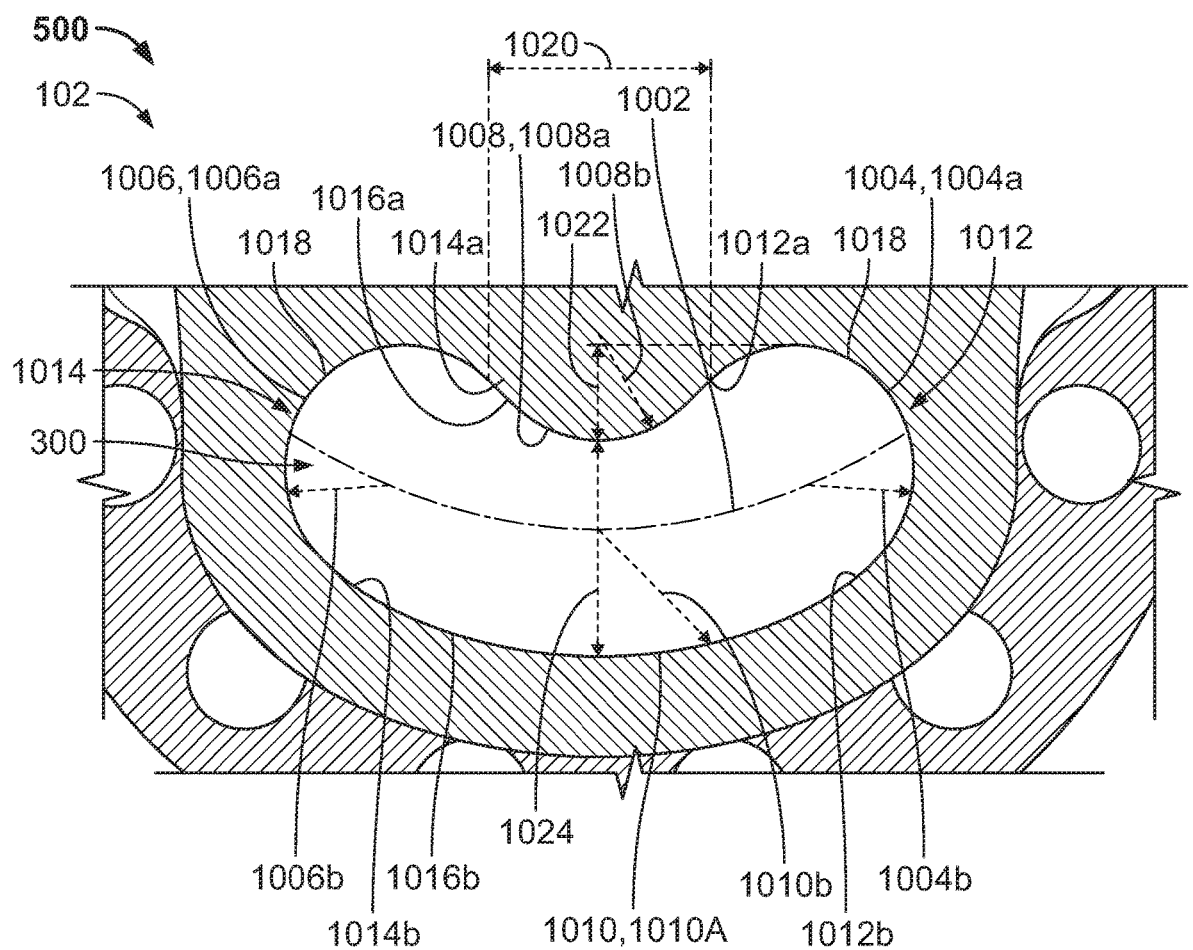
FIG. 10 is an enlarged, cross-sectional end view of the example valve body taken along lines 8-8 of FIG. 4.

FIG. 10 is a cross-sectional end view of valve body 200 taken along line 8-8 of FIG. 4. The bean-like cross-sectional shape includes a curved central axis 1002, with outwardly curved end walls 1004, 1006 and curved lateral walls 1008, 1010 joining the curved end walls 1004, 1006. For example, the bean-like shape of FIG. 10 includes a first outwardly curved end wall 1004a that has a first radius of curvature 1004b and a second outwardly curved end wall 1006a that has a second radius of curvature 1006b. For example, the outwardly curved end walls 1004, 1006 have shapes corresponding to segments of a circle (e.g., a semi-circle). One of the curved lateral walls 1010 has a radius of curvature that is significantly greater than another one of the curved lateral walls 1008. For example, a first curved lateral wall 1008a (e.g., an upper curved lateral wall in the orientation of FIG.

10) has a third radius of curvature 1008b and a second curved lateral wall 1010a (e.g., a lower curved lateral wall in the orientation of FIG. 10) has a fourth radius of curvature 1010b that is different (e.g., greater than) the third radius of curvature 1008b. The bean-like shape of FIG. 10 is a kidney bean-like shape.

In other words, the varying flow path portion 300 includes a first edge 1012 (e.g., a first portion) having a partially circular profile, a second edge 1014 (e.g., a second portion) spaced from the first edge 1012 that has a partially circular profile, and an intermediate portion 1016 between the first edge 1012 and the second edge 1014 that connects the first edge 1012 and the second edge 1014. The first edge 1012, the intermediate portion 1016 and the second edge 1014 provide a continuous (e.g., a smooth and/or uninterrupted) cross-sectional profile. The first edge 1012 defines a first end 1012a and a second end 1012b, and the second edge 1014 defines a third end 1014a and a fourth end 1014b. The intermediate portion 1016 has a third edge 1016a (e.g., a first transition) and a fourth edge 1016b (e.g., a second transition) opposite the third edge 1016a. The third edge 1016a couples the first end 1012a and the third end 1014a. The fourth edge 1016b couples the second end 1012b and the fourth end 1014b. The first edge 1012, the second edge 1014, the third edge 1016a and the fourth edge 1016b have curved profiles. The third edge 1016a and the fourth edge 1016b have upwardly oriented concave shapes in the orientation of FIG. 10. The first edge 1012 and the second edge 1014 each have a first surface 1018 that is offset relative to the intermediate portion 1016 (e.g. the curved lateral walls 1008, 1010). In the orientation of FIG. 10, the first edge 1012 and the second edge 1014 are at an elevation higher than the intermediate portion 1016 (e.g., the first curved lateral wall 1008a and the second curved lateral wall 1010a).

The radius of curvature 1004b of the first outwardly curved end wall 1004a can be between approximately 0.8 inches and 1.60 inches. The radius of curvature 1006b of the second outwardly curved end wall 1006a can be between approximately 0.80 inches and 1.60 inches. In some examples, the first radius of curvature 1004b is equal to the second radius of curvature 1006b. In some examples, the first radius of curvature 1004b is different than (e.g., greater than or less than) the second radius of curvature 1006b. The third radius of curvature 1008b of the first curved lateral wall 1008a can be between approximately 1.25 inches and 2.5 inches. The radius of curvature 1010b of the second curved lateral wall 1010a can be between approximately 3.75 inches and 6.0 inches. The upper surface 416 of the inner wall 302 can have a width 1020 of approximately between 1.75 inches and 3.0 inches, and a height 1022 of approximately between 0.5 inches and 1.25 inches. The third edge 1016a is spaced from the fourth edge 1016b at a midpoint of the third edge 1016a and the fourth edge 1016b by a distance 1024 (e.g., a vertical distance in the orientation of FIG. 10) that is between approximately 1.75 inches and 3.0 inches.

In the example of FIG. 10, a cross-sectional flow area provided by the varying flow path portion 300 taken at line 5-5 is substantially equal to a cross-sectional flow area provided by the inlet 202. As used herein, "substantially equal" means within 10 percent of equal. For example, the cross-sectional flow area of the bean-like cross-sectional shape can be within 10 percent of the cross-sectional flow area of the circular-shape cross-section provided by the inlet 202. For example, the bean-like cross-sectional shape provides a flow area that is substantially equal to a cross-sectional flow area provided by an inlet of a fluid valve having a six inch diameter. However, in some examples, the cross-sectional flow area of the bean-like cross-section of FIG. 10 is different than (e.g., less than or greater than) a cross-sectional flow area provided by the inlet 202. In some examples, the cross-sectional flow area of the bean-like cross-section of FIG. 10 can be based on a cross-sectional flow area of the orifice 216, the outlet 204 and/or any other cross-sectional flow area of the fluid passageway 206. The fluid valve 102 of the illustrated example can be a six inch valve (e.g., a six inch diameter inlet), a four inch valve (e.g., a four inch diameter inlet), and/or any other sized valve(s).

Additionally, the bean-like shape profile induces localized cross-flow to reduce and/or prevent boundary layer separation and improve flow efficiency. Such cross-flow can be induced by local pressure differential acting from an outer (e.g., the outwardly curved end walls 1004, 1006) to an inner portion (e.g., toward the curved central axis 1002) of the bean-like shape cross-section and reduces a magnitude of a streamwise adverse pressure gradient, thereby reducing and/or preventing separation of the boundary layer and associated impact on valve flow performance. To further improve fluid flow efficiency, at least some portions of the fluid passageway 206 (e.g., the varying flow path portion 300) can include at textured finish (e.g., a roughened surface, grooves, etc.).

Figure 11:
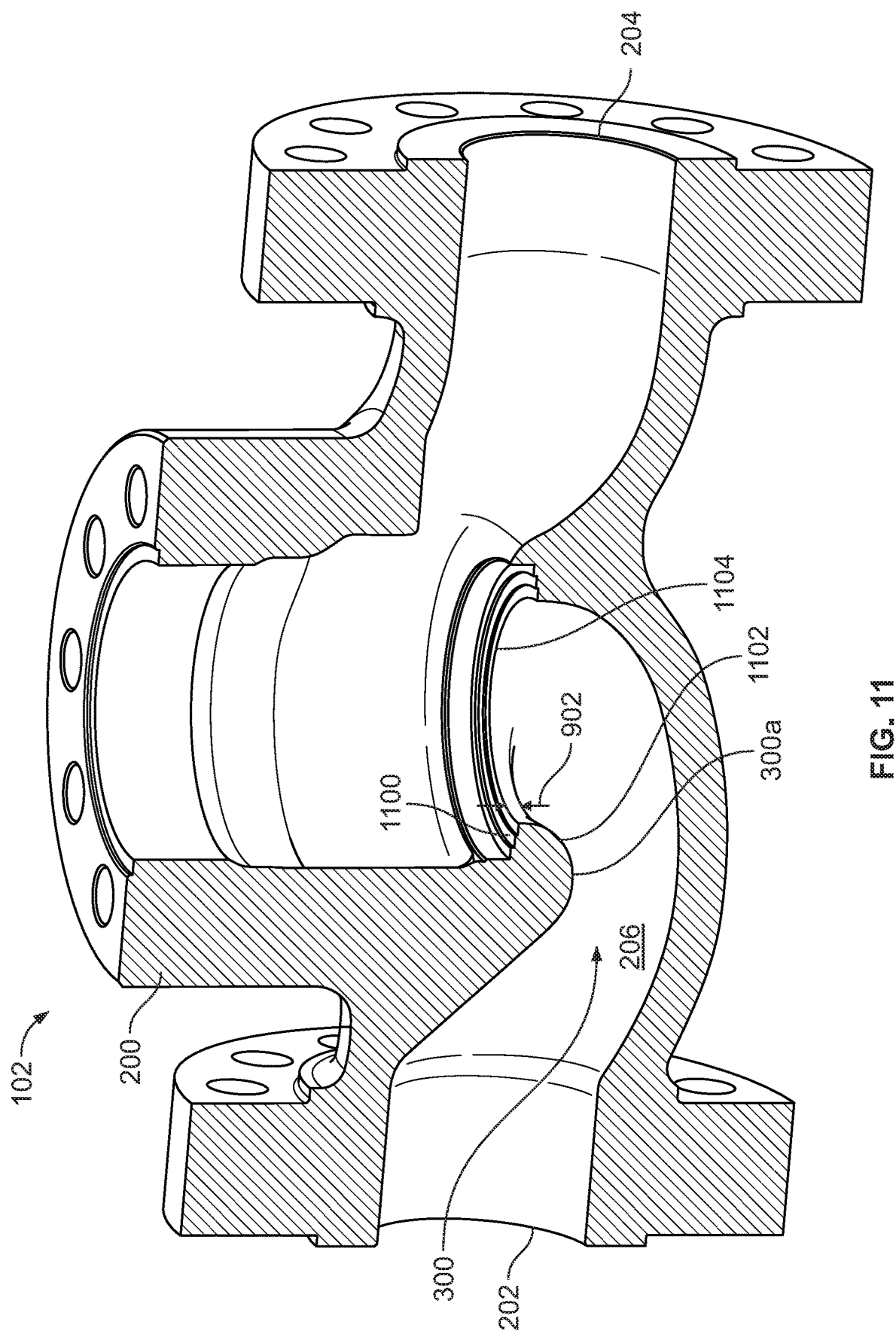
FIG. 11 is a perspective, cross-sectional view of the example valve body of FIGS. 1 and 2.

FIG. 11 is a cross-sectional, perspective view of the valve body 200. The bean-like cross-sectional shaped of the varying flow path portion 300 provides improved flow efficiency by inducing cross flow, reduces a severity of flow separation, reduces dead flow zones, and/or allows for a smoother flow turn between the inlet 202 and the orifice 216. For example, the gradual curve or profile 300a provided by the varying flow path portion 300 (e.g., the bean-like shape) provides a smoother flow transition. In addition to reducing or preventing boundary layer separation and/or providing a smoother flow turn, the varying fluid flow path 300 allows for a reduced transition or turn from a horizontal flow (e.g., the inlet 202) to a vertical flow (e.g., the orifice 216), allowing for a shorter face-to-face transition. The bean-like shape provides a higher flow efficiency (Cv) compared to a valve having the same or similar face-to-face transition and implemented without the bean-like fluid passageway 206. In some examples, a valve configured to provide the same or equivalent flow efficiency (Cv) as the valve 100 has a longer face-to-face transition than the valve 100. Thus, the valve 100 can be implemented with a shorter face-to-face transition than a valve implemented without the bean-like shape while providing the same or equivalent flow efficiency (Cv). For example, a valve body (e.g., the valve body 200) having a six inch diameter (e.g., a 6 inch valve having a Class 1500 butt weld end (BWE)) implemented with the fluid passageway 206 disclosed herein can have a face-to-face length of between approximately 20 inches and 30 inches and can provide a flow coefficient (Cv) value of between approximately 420 and 550. For example, in accordance with ANSI/ISA-75.08.05-2002 standard, a six inch valve implemented with a short face-to-face transition specifies a 24 inch length face-to-face transition with a tolerance of 0.062 inches and a six inch valve implemented with a long face-to-face transition specifies a 30.25 inch length face-to-face transition with a tolerance of 0.062 inches. Thus, in some examples, the face-to-face transition of a six inch valve implemented with the fluid passageway 206 disclosed herein can be approximately 6 inches to 8 inches smaller than a six inch valve implemented without the fluid passageway 206 disclosed herein.

Additionally, as noted above in connection with FIGS. 8 and 9, the bean-like shape of the varying flow path portion 300 increases or improves a structural strength or support of the of the web 902. The web 1100 protrudes (e.g., overhangs) from the inner wall 302 and has the thickness 902 sufficient to react pressure forces, gasket forces, and/or seating forces (e.g., imparted by the actuator 104 when the actuator 104 moves the valve plug 214 against the valve seat 212 to prevent fluid flow between the inlet 202 and the outlet 204). As a result, a portion 1102 of the web 902 (e.g., defined by the upper surface 416) provides increased structural strength.

At least some of the aforementioned examples include one or more features and/or benefits including, but not limited to, the following:

In some examples, a fluid valve includes a body defining a fluid passageway between an inlet and an outlet, at least a portion of the fluid passageway between the inlet and the outlet has a generally non-circular cross-sectional shape when taken along a plane transverse to a direction of fluid flow, the cross-sectional shape includes a curved central axis, with outwardly curved end walls and curved lateral walls joining the curved end walls.

In some examples, one of the curved lateral walls has a radius of curvature that is greater than another one of the curved lateral walls In some examples, the generally non-circular cross-sectional shape has a bean-like shape.

In some examples, the outwardly curved end walls each have a portion that is offset relative to the curved lateral walls.

In some examples, a fluid flow area defined by the generally non-circular cross-sectional shape is substantially similar to a fluid flow area defined by a generally circular cross-sectional shape of at least one of the inlet or the outlet.

In some examples, a body defining an inlet, an outlet, and a fluid passageway fluidly coupling the inlet and the outlet, at least a portion of the fluid passageway between the inlet and the outlet having a generally bean-shaped cross-section when taken along a plane transverse to a direction of fluid flow through the at least the portion of the fluid passageway.

In some examples, the inlet has a circular cross-sectional shape.

In some examples, the outlet has a circular cross-sectional shape.

In some examples, the at least the portion of the fluid passageway is located between an orifice of the fluid passageway and the outlet.

In some examples, the at least the portion of the fluid passageway is located between an orifice of the fluid passageway and the inlet.

In some examples, the at least the portion of the fluid passageway includes a first section, a second section, and a third section, the second section positioned between the first section and the third section, and wherein the first section, the second section and the third section define a length of the at least the portion of the fluid passageway, the first section having a generally circular shaped cross-section, the second section having the generally bean-shaped cross-section, and the third section having a generally circular shaped cross-section.

In some examples, the at least the portion of the fluid passageway transitions in the direction of fluid flow from a generally circular shaped cross-section, to the generally bean-shaped cross-section, and to a generally circular shaped cross-section.

In some examples, the at least the portion of the fluid passageway defines a varying fluid flow profile in a direction of fluid flow that varies from a generally circular cross-section, to a generally oval cross-section, to the generally bean-shaped cross-section, to a generally oval cross-section, and to a generally circular cross-section across a length of the at least the portion of the fluid passageway.

An example fluid valve includes a body defining an inlet, an outlet, and a fluid passageway fluidly coupling the inlet and the outlet, at least a portion of the fluid passageway between the inlet and the outlet having a generally bean-shaped cross-section when taken along a plane transverse to a direction of fluid flow through the at least the portion of the fluid passageway.

In some examples, the at least the portion of the fluid passageway includes a third section having a generally circular shape, the second section positioned between the first section and the third section.

In some examples, the at least the portion of the fluid passageway includes a fourth section having a generally oval shape, the fourth section positioned between the first section and the second section.

In some examples, the at least the portion of the fluid passageway includes a fifth section having a generally oval shape, the fifth section positioned between the second section and the third section.

In some examples, the first section defines at least one of the inlet or the outlet and the third section defines an orifice of the fluid passageway.

In some examples, the at least the portion of the fluid passageway is located between an orifice defined by the body and at least one of the inlet or the outlet.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A fluid valve comprising
a body defining a fluid passageway between an inlet and an outlet, at least a portion of the fluid passageway between the inlet and the outlet has a generally non-circular cross-sectional shape when taken along a plane transverse to a direction of fluid flow, the body having an inner wall defining the at least the portion of the fluid passageway, the inner wall including:
side surfaces that taper outwardly between a first section of the fluid passageway and a portion of a second section of the fluid passageway and taper inwardly between the portion of the second section and a third section of the fluid passageway, the second section positioned between the first section and the third section; and
an upper surface of the inner wall defining the portion of the second section protrudes into the fluid passageway between the side surfaces of the inner wall.

2. The fluid valve of claim 1, wherein the generally non-circular cross-sectional shape has a bean-like shape.

3. The fluid valve of claim 1, wherein a fluid flow area defined by the generally non-circular cross-sectional shape is substantially equal to a fluid flow area defined by a generally circular cross-sectional shape of at least one of the inlet or the outlet.

4. The fluid valve of claim 1, wherein the generally non-circular cross-sectional shape includes a curved central axis, with outwardly curved end walls and curved lateral walls joining the curved end walls.

5. The fluid valve of claim 4, wherein one of the curved lateral walls has a radius of curvature that is significantly greater than another one of the curved lateral walls.

6. The fluid valve of claim 4, wherein the outwardly curved end walls each have a portion that is offset relative to the curved lateral walls.

7. A fluid valve comprising:
a body defining an inlet, an outlet, and a fluid passageway fluidly coupling the inlet and the outlet, at least a portion of the fluid passageway between the inlet and the outlet having a varying cross-section transverse to a direction of fluid flow through the at least the portion of the fluid passageway, the at least the portion of the fluid passageway transitions in the direction of fluid flow from a generally circular cross-sectional shape, to a generally oval cross-section, to a generally bean-shaped cross-section, to a generally oval cross-section, and to a generally circular cross-section across a length of the at least the portion of the fluid passageway.

8. The fluid valve of claim 7, wherein the inlet has a circular cross-sectional shape.

9. The fluid valve of claim 7, wherein the outlet has a circular cross-sectional shape.

10. The fluid valve of claim 7, wherein the at least the portion of the fluid passageway is located between an orifice of the fluid passageway and the outlet.

11. The fluid valve of claim 7, wherein the at least the portion of the fluid passageway is located between an orifice of the fluid passageway and the inlet.

12. The fluid valve of claim 7, wherein the at least the portion of the fluid passageway includes a first section, a second section, and a third section, the second section positioned between the first section and the third section, and wherein the first section, the second section and the third section define a length of the at least the portion of the fluid passageway, the first section having the generally circular shaped cross-section, the second section having the generally bean-shaped cross-section, and the third section having the generally circular shaped cross-section.

13. A fluid valve comprising:
a body defining a fluid passageway between an inlet and an outlet, at least a portion of the fluid passageway defines a cross-sectional shape that varies in a direction of fluid flow, the at least the portion of the cross-sectional shape of the fluid passageway having:
a first section having a generally circular shape;
a second section having a generally bean-like shape; and
a third section having a generally oval shape.

14. The fluid valve of claim 13, wherein the at least the portion of the fluid passageway is located between an orifice defined by the body and at least one of the inlet or the outlet.

15. The fluid valve of claim 13, wherein the third section positioned between the first section and the second section.

16. The fluid valve of claim 15, wherein the at least the portion of the fluid passageway includes a fourth section having a generally circular shape, the second section positioned between the first section and the fourth section.

17. The fluid valve of claim 16, wherein the at least the portion of the fluid passageway includes a fifth section having a generally oval shape, the fifth section positioned between the second section and the fourth section.

18. The fluid valve of claim 17, wherein the first section defines at least one of the inlet or the outlet and the fourth section defines an orifice of the fluid passageway.

* * * * *